(No Model.) 3 Sheets—Sheet 1.

A. NELSON.
FRICTION CLUTCH.

No. 384,268. Patented June 12, 1888.

WITNESSES:
Edward S. Beach,
John R. Snow.

INVENTOR:
Anthony Nelson,
by his attorney,
J. E. Maynader.

(No Model.) 3 Sheets—Sheet 2.
A. NELSON.
FRICTION CLUTCH.
No. 384,268. Patented June 12, 1888.
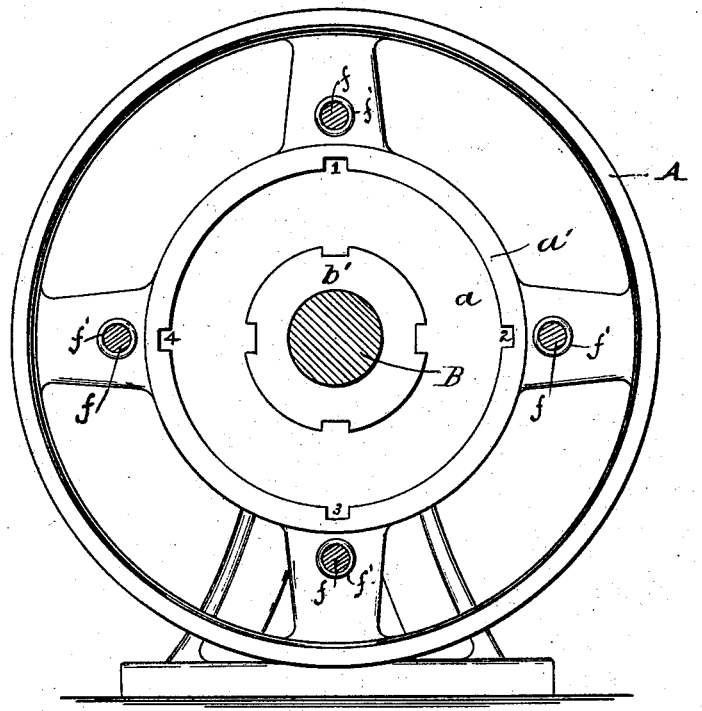
Fig. 2.
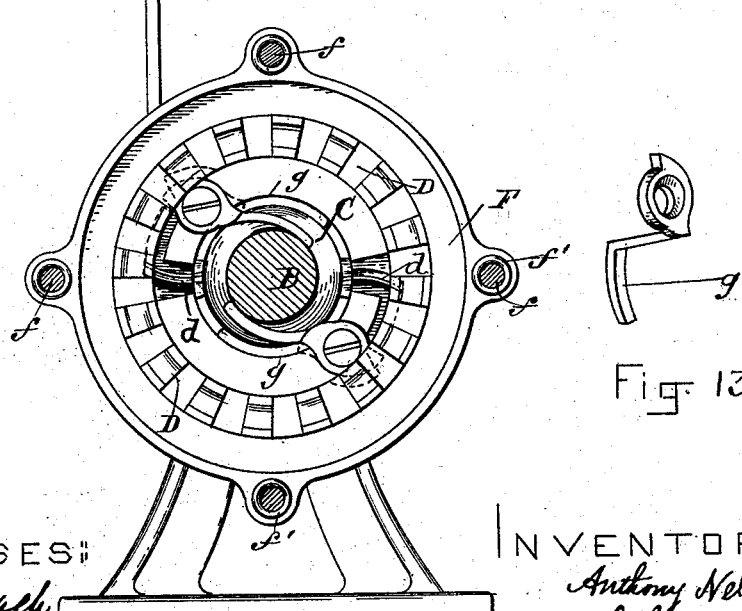
Fig. 13.
Fig. 3.
WITNESSES:
Edward S. Beach
John R. Snow
INVENTOR:
Anthony Nelson
by his attorney,
J. E. Maynadier (No Model.) 3 Sheets—Sheet 3.

A. NELSON.
FRICTION CLUTCH.

No. 384,268. Patented June 12, 1888.

WITNESSES:
Edward S. Beach.
John R. Snow.

INVENTOR:
Anthony Nelson.
by his attorney,
J. E. Maynadier.

N. PETERS, Photo-Lithographer, Washington, D. C.

United States Patent Office.

ANTHONY NELSON, OF BOSTON, MASSACHUSETTS, ASSIGNOR TO JAMES BENNETT FORSYTH, OF SAME PLACE.

FRICTION-CLUTCH.

SPECIFICATION forming part of Letters Patent No. 384,268, dated June 12, 1888.

Application filed April 30, 1887. Serial No. 236,631. (No model.)

*To all whom it may concern:*

Be it known that I, ANTHONY NELSON, residing in Boston, in the county of Suffolk and State of Massachusetts, a subject of the King of Denmark, have invented a new and useful Friction-Clutch, of which the following is a specification, reference being had to the accompanying drawings, in which—

Figures 1, 12:
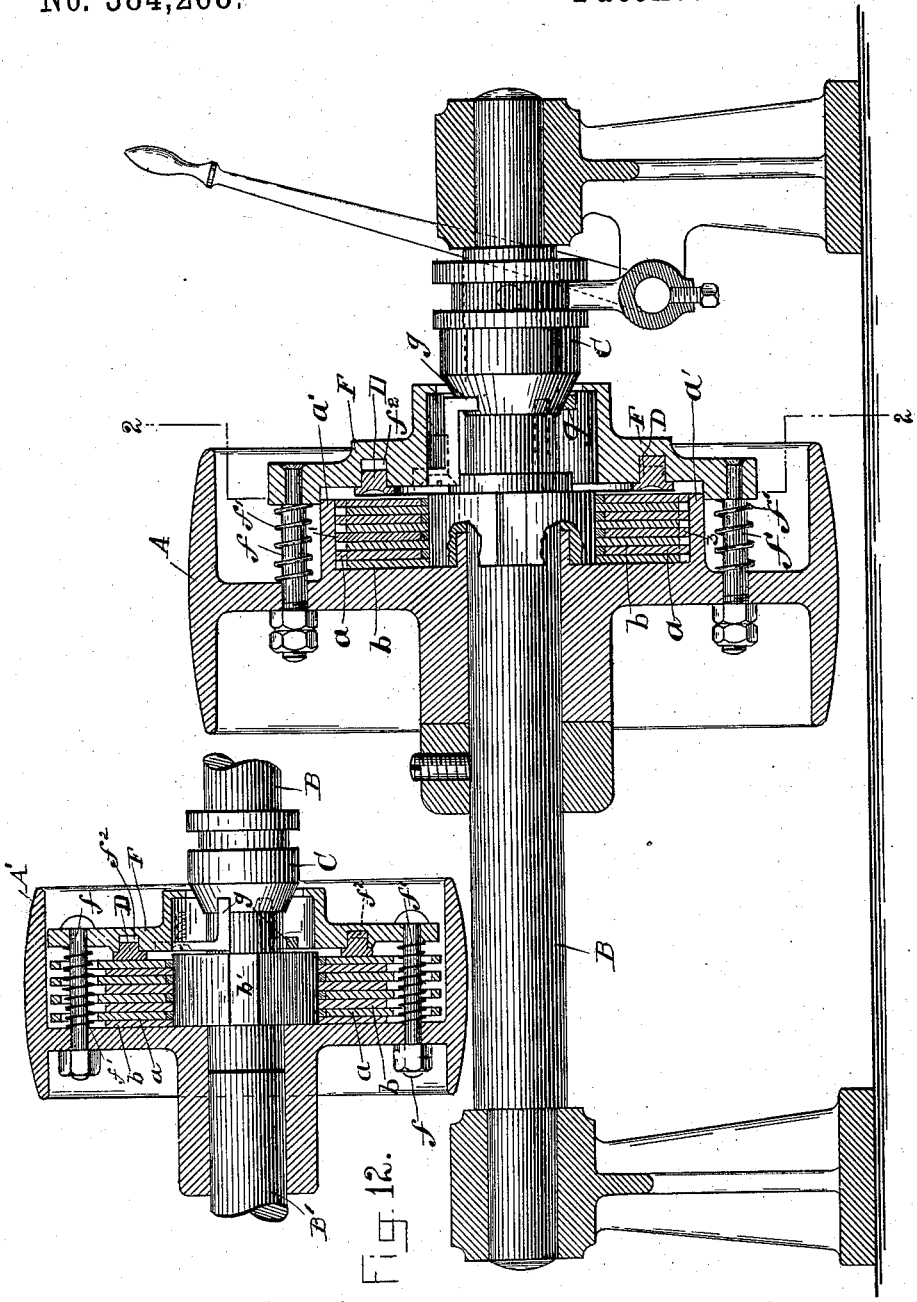
Figure 4:
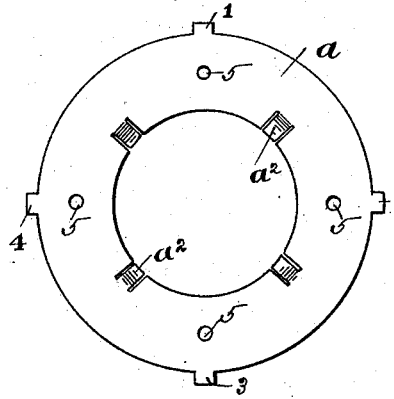
Figures 5, 6:
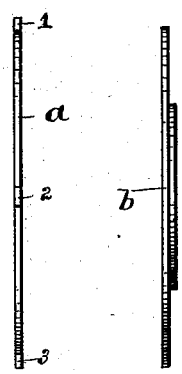
Figure 7:
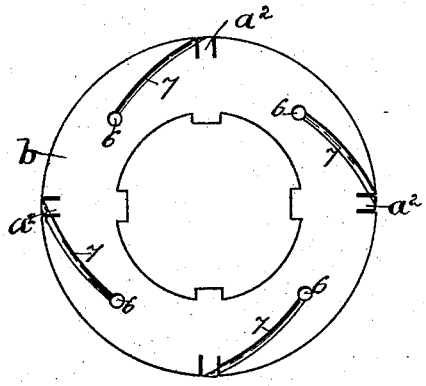
Figure 8:
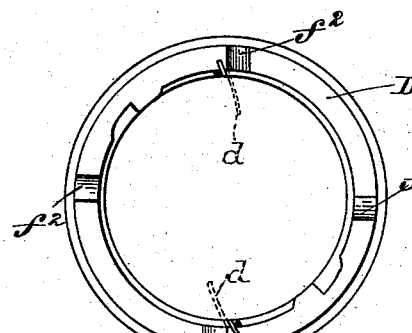
Figure 9:
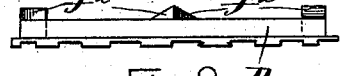
Figure 10:
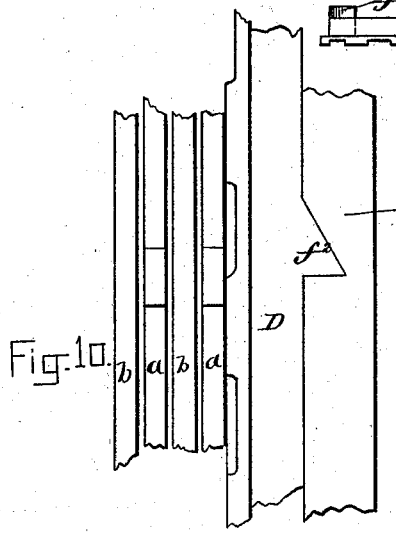
Figure 11:
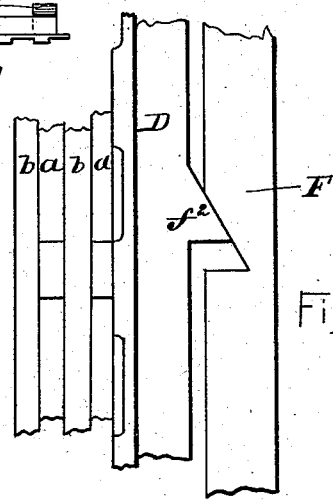

Figure 1 is a longitudinal elevation of one form of my invention. Fig. 2 is a section on line 2 2 of Fig. 1, looking toward the left; and Fig. 3, a like section looking toward the right; Figs. 4, 5, 6, and 7, details of friction-plates; Figs. 8 and 9, details of the vertical ring, and Figs. 10 and 11 enlarged views illustrating the preferred means of forcing the friction-plates against each other. Fig. 12 is an axial section illustrating two shafts coupled together by my device. Fig. 13 is a detail view.

My invention is a friction-coupling; and it consists, essentially, of a ring-follower, in combination with two sets of plates, the plates of one set being connected to a pulley or its equivalent and of the other set to a shaft or its equivalent, the two sets of plates being arranged as shown, so that when crowded together flatwise by the ring-follower a friction shall result sufficient to compel the shaft and pulley or two shafts to revolve together or to stop a revolving shaft when my device is used as a brake.

In the drawings, A represents a loose pulley, and B a shaft upon which the pulley A rotates freely when my clutch is unclutched. The pulley A has secured to it a number of plates, $a$, in such a manner as that the plates $a$ must rotate with pulley A, but are free to be moved longitudinally. A second set of plates, $b$, is secured in like manner as plates $a$ to shaft B, to permit longitudinal movement, the plates $a$ alternating with the plates $b$, as shown, so that pulley A and shaft B are firmly connected by the friction of plates $a$ $b$ whenever the plates $a$ and $b$ are pressed together, and pulley A can rotate freely, while shaft B does not rotate whenever the plates $a$ can rotate independently of plates $b$.

In Fig. 12 I have shown two shafts, B B', coupled together by my invention. Here the plates $a$ and $b$ are connected as before; but the plates $a$ are connected to the part A, which is fast to shaft B', and may be a pulley or a mere coupling-piece, while the plates $b$ are connected to shaft B. The details of construction are somewhat different; but, as will be clear, the contrivance is the same in substance.

The details of construction shown in Fig. 1 are as follows: The pulley A has on one side flange $a'$, thereby forming a chamber for the reception of the friction-plates. The inner surface of this flange $a'$ is grooved to receive projections 1, 2, 3, and 4 on plates $a$. (See Figs. 2, 4, and 5.) The shaft B has an enlargement, $b'$, upon it to receive the plates $b$, and this enlargement $b'$ is shaped so that the shaft B cannot rotate without carrying plates $b$ with it. The plates $a$ and $b$ are then placed alternately in place, and cap F is applied to cover flange $a'$. This cap F is adjustable by means of the screw-bolts $f$ and springs $f'$, so as to bring the follower D into proper relation with plates $a$ $b$. The follower D is a ring which rests in a groove on the inner face of cap F, and has inclines $f^2$, which slide on inclines formed in the bottom of the groove in cap F, (see Figs. 10 and 11,) so that the follower D must move toward or away from plates $a$ $b$ whenever it is rotated slightly on its axis. The cone C, which is moved forward and back in the usual way, (too familiar to need further description,) engages with the levers $g$, which levers when actuated by the cone C, as shown in dotted lines in Fig. 3, partially rotate the follower D on its axis, and thus cause it to press the plates $a$ $b$ firmly together. When cone C is moved back, the follower D is rotated in the other direction, and also pressed back into its groove in cap F by the springs $d$ $d$, which are slanted, as shown, for that purpose—that is, so that they will not only cause follower D to rotate slightly on its axis, but will also press follower D back into its groove.

The acting face of follower D is preferably notched, as shown; but this is not, of course, essential, being a mere detail of construction, as are the other devices relating to the means of moving follower D forward and back.

The plates $a$ are perforated at 5 and plates $b$ are perforated at 6 and grooved at 7, as shown, in order to form air-passages between them, as thereby they separate more readily when the clutch is uncoupled, and light springs $a^2$ may be inserted in either plate to diminish contact between the plates.

In Fig. 12 the part A', which I have shown as a pulley, is fast to shaft B', and is provided with a socket to receive one end of shaft B. The plates $a$ are also held to part A' by means of the bolts $f$, which hold the cap F in position and support the springs $f'$ to aid in the adjustment of cap F. The enlargement $b'$ is fast to shaft B and carries plates $b$, as before explained. In all other respects the device shown in Fig. 12 is like the device shown in the other figures.

It will be clear that when the part A is so fixed that it can never revolve then my device will be a friction-brake; but when the part is adapted to revolve it is more properly called a "coupling." It is in truth a "friction-clutch," if that term be used, as I have used it, to include both a friction-brake and a friction-coupling.

Another feature of my invention consists in the combination of a pulley which has a lateral annular flange, within which lie the friction-plates $a b$, with a cap, F, and its adjusting-bolts $f$ and springs $f'$, so that the follower can readily be adjusted with relation to the plates.

A third feature of my invention consists in a pulley provided with a chamber formed within the rim of the pulley, in combination with a set of plates, $a\ b$, packed within the chamber and closed by a cap, F, thereby producing a friction coupling which is not only strong and simple in its construction, but exceedingly compact—a matter of very great importance for many uses of such a device.

I am aware of Weston's patents, No. 217,032, July 1, 1879; No. 298,968, February 5, 1884, and No. 304,497, September 2, 1884, and disclaim all that is shown in them.

I am also aware of patents No. 250,892, Daly, December 13, 1881; No. 265,953, Frisbie, October 17, 1882; No. 365,707, White and Moore, May 24, 1887; Reissue No. 6,105, to Harfield, October 27, 1874, and No. 305,197, Kelly, September 16, 1884, and disclaim all that is shown in them.

What I claim is—

1. In a friction-clutch, pulley carrying longitudinally-sliding plates $a$, and shaft B, carrying longitudinally-sliding plates $b$, in combination with follower D, having inclines $f^2$, and cap F, having corresponding inclines, substantially as and for the purpose set forth.

2. In a friction-coupling, pulley A, having a lateral annular flange, $a'$, friction-plates $a b$, follower D, and means for partially rotating it, in combination with cap F, covering the annular flange $a'$, within which lie the friction-plates and the follower, substantially as described.

3. In a friction-clutch, friction-plates $a b$, provided with grooves 7, substantially as and for the purpose set forth.

ANTHONY NELSON.

Witnesses:
EDWARD S. BEACH,
JOHN R. SNOW.